United States Patent
Fuche et al.

(10) Patent No.: US 8,971,420 B2
(45) Date of Patent: Mar. 3, 2015

(54) METHOD AND SYSTEM PERMITTING THE SEQUENTIAL REORGANIZATION OF SIGNALS

(75) Inventors: Loic Fuche, Maulevrier (FR); Anthony Bellion, Les Essarts (FR); Cyrille Le Meins, Angers (FR); Jean-Pierre Friconneau, Montagne sur Sevre (FR); Patrice Stevens, Maulevrier (FR)

(73) Assignee: Thales, Neuilly sur Seine (FR)

( * ) Notice: Subject to any disclaimer, the term of this patent is extended or adjusted under 35 U.S.C. 154(b) by 1749 days.

(21) Appl. No.: 12/306,396

(22) PCT Filed: Jun. 28, 2007

(86) PCT No.: PCT/EP2007/056523
§ 371 (c)(1), (2), (4) Date: Oct. 20, 2009

(87) PCT Pub. No.: WO2008/000806
PCT Pub. Date: Jan. 3, 2008

(65) Prior Publication Data
US 2011/0313324 A1    Dec. 22, 2011

(30) Foreign Application Priority Data
Jun. 29, 2006    (FR) ...................... 06 05884

(51) Int. Cl.
H04B 14/04    (2006.01)
H04B 7/08    (2006.01)

(52) U.S. Cl.
CPC ............ H04B 7/0805 (2013.01); H04B 7/0822 (2013.01)
USPC ............ 375/243; 375/226; 600/587; 600/595

(58) Field of Classification Search
USPC ............................. 375/356, 226, 240.27, 243; 600/598–595
See application file for complete search history.

(56) References Cited

U.S. PATENT DOCUMENTS

| | | | |
|---|---|---|---|
| 3,697,957 A * | 10/1972 | Barron | 700/47 |
| 4,075,631 A | 2/1978 | Dumez et al. | |
| 4,188,578 A | 2/1980 | Reudink et al. | |
| 4,419,918 A | 12/1983 | Dyck et al. | |
| 4,646,754 A | 3/1987 | Seale | |
| 4,774,677 A * | 9/1988 | Buckley | 706/23 |
| 5,206,860 A * | 4/1993 | Brown et al. | 714/712 |
| 5,515,454 A * | 5/1996 | Buckley | 382/157 |
| 5,617,871 A * | 4/1997 | Burrows | 600/300 |
| 5,675,713 A * | 10/1997 | Batten, Jr. | 706/26 |
| 5,838,680 A | 11/1998 | Noiri | |
| 5,940,529 A * | 8/1999 | Buckley | 382/155 |
| 7,280,810 B2 * | 10/2007 | Feher | 455/137 |
| 7,333,576 B2 * | 2/2008 | Satomi et al. | 375/350 |
| 8,079,962 B2 * | 12/2011 | Takai et al. | 600/587 |
| 8,295,403 B2 * | 10/2012 | Chan et al. | 375/327 |
| 2006/0189902 A1 * | 8/2006 | Takai et al. | 600/595 |
| 2007/0208232 A1 * | 9/2007 | Kovacs | 600/300 |
| 2008/0152046 A1 * | 6/2008 | Armstrong et al. | 375/343 |

FOREIGN PATENT DOCUMENTS

| | | | | |
|---|---|---|---|---|
| EP | 0428448 A1 | 5/1991 | | |
| EP | 472867 A2 * | 3/1992 | ............. | G06F 11/00 |
| EP | 0594352 A2 | 4/1994 | | |
| EP | 1294123 A1 * | 3/2003 | ............. | H04L 7/033 |
| FR | 2295434 A1 | 7/1976 | | |

* cited by examiner

Primary Examiner — Sean Dougherty

(74) Attorney, Agent, or Firm — Stroock & Stroock & Lavan LLP

(57) ABSTRACT

A method and system for sequentially reorganizing signals received on a set of sensors, including a network of aerials or sensors, a high-precision clock, controlling a sequencer and suitable for accurately pacing the switching and acquisition times between each aerial, the sequencer is suitable for controlling an antenna switch, an the antenna switch linked to a single-channel radiofrequency receive module, an acquisition card, and a processing model.

9 Claims, 1 Drawing Sheet

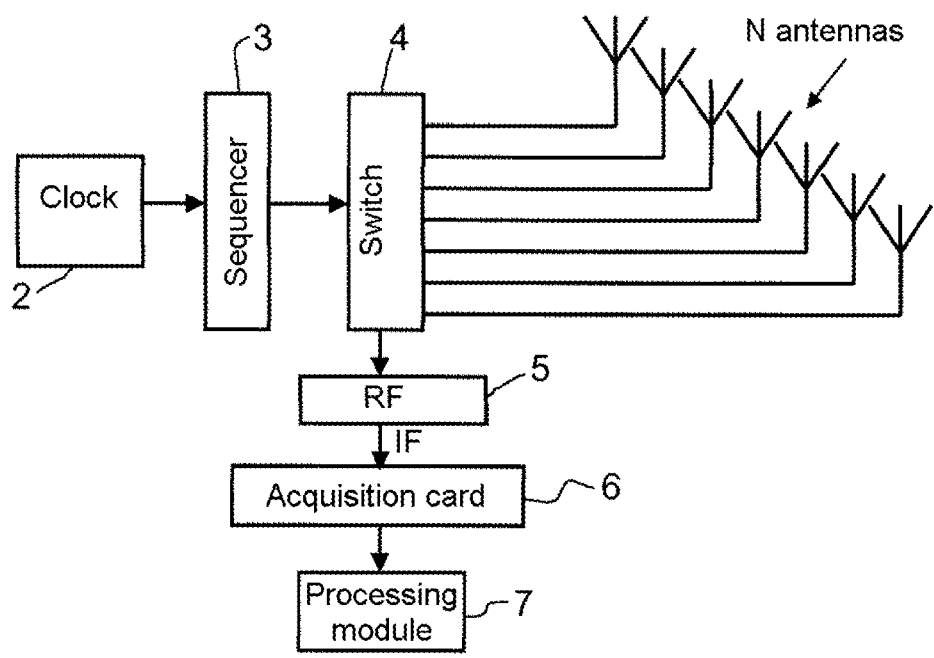

METHOD AND SYSTEM PERMITTING THE SEQUENTIAL REORGANIZATION OF SIGNALS

This is a U.S. National Phase application under 35 U.S.C. §371 of International Application No. PCT/EP2007/056523, filed Jun. 28, 2007 and claims benefit of French Patent Application No. 0605884, filed Jun. 29, 2006, both of which are incorporated in their entireties herein. The International Application was published in French on Jan. 3, 2008 as WO 2008 000806 under PCT Article 21(2).

The invention relates notably to a system and a method for sequentially reorganizing signals.

The invention applies to any electronic precision and signal processing application dedicated to signal acquisition systems (for example, digital receivers).

The "sequential reorganization of signals" function makes it possible, in a goniometry context, for example, to acquire one by one the signals received on a network of aerials, and to process them as if they had been acquired simultaneously.

In the case of goniometry, for example, the current principle of reception is based on the use of analog circuits (hereinafter called hybrids), placed on the aerials, and allowing processing operations on signals acquired at the same instants on several aerials. This concept enables the receiver to acquire a combination of aerials, but not just one aerial. This principle therefore reduces the usage band and is reserved for systems operating in a narrow band, below an octave.

The systems known from the prior art generally use as many receive channels as there are aerials when acquiring signals. The low bandwidth of the hybrid circuits therefore implies there has to be a lot of them, resulting in a high cost, to be able to cover the entire desired frequency band. Another drawback of such systems is that it is not the signal itself that is digitized, but a function corresponding to the signal present on two aerials.

The systems according to the prior art do not make it possible to access amplitude information which is limiting from the algorithmic point of view, particularly in goniometry.

The techniques of the prior art known to the applicant do not make it possible to operate over a wide frequency band. Nor do they allow for an accurate synchronization of the signals. Furthermore, they do not allow the actual acquisition of the signals, but only the acquisition of the image of the phase ratio of signals taken in pairs, which limits the downstream digital processing operations.

Embodiments of the invention relate to a system for sequentially reorganizing signals received on a set of sensors, characterized in that it comprises, in combination, at least the following elements:
   a network of sensors,
   a clock, controlling a sequencer and adapted for accurately pacing the switching and acquisition times between each sensor,
   the sequencer is adapted for controlling a sensor switch,
   the sensor switch, with an acquisition card and a processing model.

Embodiments of the invention also relates to a method for sequentially reorganizing signals received on a set of sensors, characterized in that it comprises at least the following steps:
   acquiring a signal received on a sensor of the set, storing it then switching to acquire another signal received on another sensor of the set,
   repeating the acquisition of the signals received on each of the sensors of the set until all the sensors or most of them have been scanned, and storing all the acquired information,
   selecting one of the sensors on which the signal has been acquired previously and repeating a signal acquisition and storage cycle for this reference signal,
   comparing this acquisition with the acquisition previously obtained for the same sensor,
   determining, from this comparison, the existing switching error,
   applying the error correction to each of the stored signals, correcting the phase error due to the switching time.

The object of the invention has notably as advantages of eliminate the hybrid components from the systems according to the prior art and sequentially acquiring the signals on each aerial while controlling the phase errors.

Other characteristics and advantages of embodiments of the present invention will become more apparent from reading the description that follows, with FIG. 1 which represents an exemplary system structure given as an illustrative and by no means limiting example.

FIG. 1 represents a system structure comprising, for example:
   a network of aerials $1n$ or sensors,
   a high-precision clock 2, controlling a sequencer 3 and making it possible to accurately rate the switching and acquisition times between each aerial $1n$,
   the sequencer 3 itself controls an antenna switch 4, for the reception of the signals,
   the antenna switch 4 is linked to a single-channel radiofrequency receive module 5,
   an acquisition card 6 and a processing model 7.

The antenna switch 4 is notably adapted for and chosen to execute the switchover from one aerial to another. The antenna switch 4 is, for example, an N-aerial-to-1-receive-channel switch.

The function of the antenna switch 4 is notably to allow the passage of the signals from one aerial to the devices situated in the processing subsystem and to block the signals originating from the other aerials. It notably offers the particular feature of having a response time on opening/closure that is identical or substantially identical to each of the aerial channels.

The sequencer 3 generates the switch management function. Its function is notably to select the channel that is connected to the desired aerial.

The clock 2 is used to rate the sequencer. The scanning cycle for all the aerials is chosen for the frequency of the clock to be stable. The order of magnitude is, for example, $10^{-10}$.

The RF device 5 is a radio reception module. The function of this module is notably to transpose the receive frequency band to an intermediate frequency which is returned to the acquisition card 6.

The acquisition card is suitable notably for quantizing the signals received on each aerial and sending them to the processing module 7.

In the case of a goniometry application, the system implements a goniometry algorithm appropriate to the antenna system.

The structure operates, for example, as described below.

The idea is based notably on a sequential acquisition of the signals on each aerial, and making them consistent time-wise while controlling the phase errors.

It is assumed that the signal is stationary or substantially stationary during a signal acquisition cycle. It is considered that a given signal is characterized from minus infinity to plus infinity, if only this signal is characterized over a short duration which makes it possible to determine its phase and its amplitude. When this characterization or modeling is done, it is then possible to estimate the value of the signal either in the past or in the future.

1. Each aerial is connected to an N to 1 antenna switch which is controlled by the sequencer rated at a clock speed,
2. a signal is acquired on an aerial then the system switches to the next aerial,
3. the acquisition is repeated and the cycle is recommenced until the last aerial, the acquisitions and the storage on the N antennas of the network of aerials are thus performed, each signal having been transposed thanks to the radio receiver to a radiofrequency.

A reference signal is then selected from those that have been acquired, then an N+1 switching is performed, that is, for example, to the first aerial, and an acquisition is repeated. The latter acquisition is compared to the first acquisition. This comparison makes it possible to determine any existing error and realign each of the acquisitions. Since the signal is considered to be stationary or substantially stationary during a signal acquisition cycle (acquisition over a very brief duration), it is possible to estimate its value relative to that acquired and therefore to deduce therefrom the drift that is simply the switching errors.

4. Knowing the different errors, the system can:
    initially, correct the overall error on each stored signal, and
    then, correct the phase error due to the switching time.

It is then possible to synchronize the stored signals in order to apply the appropriate antenna processing operations.

The system is paced in time with the sequencer with the precision of the clock. The sequencer controls the switch.

The steps described previously apply, for example, to goniometry applications.

The system and the method according to embodiments of the invention apply to any measurement subsystem that implements an acquisition of signals in parallel.

The invention claimed is:

1. A system for sequentially reorganizing signals, the system comprising:
    a plurality of sensors;
    a sensor switch having an output port and a plurality of sensor input ports, each input port respectively connected to one of the plurality of sensors, the sensor switch configured to pass a signal on a selected one of the input ports to the output port;
    a sequencer configured to control sequential switching of the sensor switch;
    a clock for clocking the sequencer, the clock configured for switching and acquisition timing of the sequencer;
    an acquisition card in communication with the output port of the sensor switch, the acquisition card configured to acquire respective signals received from the sensors as sequentially provided by the sensor switch controlled by the sequencer; and
    a processing module in communication with the acquisition card, the processing module configured to:
        compare a repeated acquisition of at least one of the sensors with an acquisition previously obtained for the at least one of the sensors;
        utilize the comparison to determine an existing switching error;
        utilize the switching error to apply error correction to stored signals acquired by the acquisition card; and
        correct a phase error caused by a switching time.

2. The system as claimed in claim 1, wherein the sensor switch is an N to 1 receive channel switch.

3. The system as claimed in claim 1, further comprising a formatting module for formatting a signal between the sensor switch and the acquisition card.

4. The system as claimed in claim 3, wherein the formatting module is a single-channel radiofrequency receive module.

5. The system as claimed in claim 1, further comprising a goniometry module.

6. A method for sequentially reorganizing signals received on a plurality of sensors, comprising the steps of:
    using an acquisition card to acquire a signal received from a sensor of the plurality of sensors;
    storing said signal and then controlling switching of a sensor switch to acquire another signal received from another sensor of the plurality of sensors;
    repeating acquisition of respective signals received from each of the sensors of the plurality of sensors until at least a majority of the sensors have been polled and storing the respective acquired information;
    selecting at least one of the sensors on which the respective signal has been previously acquired and repeating a signal acquisition and recording cycle; and
    using a processing module, the processing module configured to:
        compare the repeated acquisition with the acquisition previously obtained for the selected sensor;
        utilize the comparison to determine an existing switching error;
        utilize the switching error to apply error correction to each of the stored signals; and
        correct a phase error caused by a switching time.

7. The method as claimed in claim 6, wherein the selected sensor is a first sensor.

8. The method as claimed in claim 6, further comprising a goniometry step.

9. The method as claimed in claim 7, further comprising a goniometry step.

* * * * *